United States Patent [19]

Stevens

[11] 4,075,536

[45] Feb. 21, 1978

[54] CAPACITOR CHARGING SYSTEM

[76] Inventor: Carlile R. Stevens, 468 El Rio Road, Danville, Calif. 94526

[21] Appl. No.: 708,851

[22] Filed: July 28, 1976

[51] Int. Cl.[2] ........................ H05B 41/32; H02J 15/00

[52] U.S. Cl. ............................. 315/241 P; 315/241 R; 320/1; 323/43.5 S; 363/74

[58] Field of Search ........................ 315/241 P, 241 R; 320/1; 307/108; 323/43.5 S; 321/45 R, 18; 363/74

[56] References Cited

U.S. PATENT DOCUMENTS 3,706,022 12/1972 Corey et al. ............................ 320/1

3,917,975 11/1975 Birkner ............................ 315/241 P

*Primary Examiner*—Eugene R. LaRoche

*Attorney, Agent, or Firm*—Roger A. Marrs

[57] ABSTRACT

A system for charging an energy storage capacitor for use with an electronic flash lamp or laser employs stepped sequential application of increasing charging voltages to the capacitor. In an inverter-type power supply, a transformer has a tapped primary and a single secondary, output of which is rectified and applied to the capacitor. A plurality of pairs of drive transistors are used to apply an alternating voltage to progressively decreasing portions of the transformer primary, in response to a feedback signal indicative of the voltage to which the capacitor has been charged. This feedback signal is utilized by a level detector and associated drive control logic to enable a different pair of drive transistors each time a preestablish charge voltage level has been reached. A driver inhibit circuit insures that, as each pair of drive transistors is alternating on and off, that one transistor is fully off before the other is turned on. The inhibit circuit also turns off all of the drive transistors when the energy storage capacitor is discharged, so that the power supply is not overloaded when the capacitor discharges to flash the lamp.

3 Claims, 3 Drawing Figures

CAPACITOR CHARGING SYSTEM

BACKGROUND OF THE INVENTION

1. Field of the Invention

The present invention relates to an efficient system for charging an energy storage capacitor such as that used to fire an electronic flash lamp. More particularly, it relates to such a system in which the capacitor is charged in stepped sequence to progressively higher voltage levels, so that the charging rate curve is a linear approximation of the optimum exponential charging curve of the capacitor.

2. Description of the Prior Art

High intensity electronic flash units have gained widespread acceptance for photographic applications, both as an integral component of the camera itself, or as an independent unit that is synchronized with the camera. In either case, a flash lamp is employed that produces an intense, short duration burst of light when appropriately excited. The flash is initiated by an ionizing pulse provided to a triggering element of the lamp. Upon ionization, a large burst of electrical energy must be supplied to the lamp, and this is provided by an energy storage capacitor which has previously been charged to a high energy level.

To provide portability, electronic flash units advantageously are battery powered. The lifetime of the battery, as measured by the number of lamp flashes that can be obtained before the battery must be replaced, is a function of the efficiency with which the energy storage capacitor can be charged. In prior art systems, such charging efficiency is low, typically on the order of forty percent. Indeed, for a system in which the charging current is limited to a particular maximum, the charging voltage as a function of time is a straight line. This means that the energy dissipated in the power supply initially is equal to the amount of energy transferred to the capacitor. Thus 50 percent efficiency is the maximum theoretically possible.

From an efficiency standpoint, it is most desireable to charge the energy storage capacitor along an exponential charging curve. Indeed, it is the principle object of the present invention to provide a system for charging a capacitor along a linear approximation of the optimum charge curve, thereby to obtain very efficient capacitor charging. Another object of the present invention is to charge the capacitor to sequentially stepped, increasing voltage levels in response to measurement of the actual voltage across the capacitor.

Some effort has been made in the past to accomplish capacitor charging in steps. An example is shown in the U.S. Pat. No. 3,654,537 to Coffey. There, a transformer has a plurality of secondary windings, each with a successively increasing number of turns. Separate bridge rectifiers are associated with each winding, and the outputs of these rectifiers are sequentially applied to the capacitor using a series of transistor switches coupled to a synchronizing firing circuit. While stepped charging of the capacitor is achieved, the circuit requires high voltage transistors to accomplish the switching. Moreover, the synchronizing circuit operates in binary counting fashion to apply progressively larger voltages to the capacitor, without the use of feedback to ascertain the charge level on the capacitor.

In other prior art systems, an inductive choke was included in the charging circuit to prevent excessive current surges, particularly at the beginning of the capacitor charging cycle. Such an inductive choke significantly increased the size and weight of the power supply, and made such power supplies inappropriate for light weight, portable uses. It is another object of the present invention to provide a light weight, efficient energy storage capacitor charging system which does not require an inductive choke to prevent excessive current surges.

SUMMARY OF THE INVENTION

These and other objectives are achieved by providing an energy storage capacitor charging system in which the capacitor is charged in stepped sequence to increasing voltage levels. The system employs an inverter-type power supply having an output transformer with a single output winding. The transformer output is rectified and applied to the energy storage capacitor. The transformer primary is tapped, and an alternating voltage is applied to progressively decreasing portions of the transformer primary under control of circuitry that is directly responsive to the measured voltage across the energy storage capacitor. With this system, the charging rate of the capacitor is a linear approximation of the optimum charging curve.

The transformer primary is driven by a set of drive circuits connected to the various transformer primary taps. Only two of the drivers are operative at a time, and these are turned on alternately by a signal provided from an oscillator and divider circuit. A level detector, responsive to the voltage level to which the capacitor has been charged, cooperates with a drive control circuit to establish which pair of drivers is operative at a particular time. Initially, the pair of drivers which energize the entire transformer primary are enabled. As a result, a relatively low voltage is applied to the energy storage capacitor, but with high charging current capability. Then, sequentially, other pairs of drivers energize successively decreasing numbers of transformer primary turns. This results in a stepped increase in the charging voltage applied to the energy storage capacitor, but with decreasing current capability. Optimum charging efficiency results.

A driver inhibit circuit plays a dual function. First, during charging of the capacitor, the transformer drive transistors both are inhibited for a brief period of time at each alternation. This insures that one of the pair of drive transistors is completely turned off before the other one is turned on. Secondly, in systems where the energy storage capacitor is used to power a flash lamp, the driver inhibit circuit turns off all of the transformer drive transistors at the time when the energy storage capacitor is discharged to flash the lamp. This prevents short-circuit overloading of the capacitor charging circuitry as the capacitor is discharged.

BRIEF DESCRIPTION OF THE DRAWINGS

A detailed description of the invention will be made with reference to the accompanying drawings wherein like numerals designate corresponding elements in the several figures.

DESCRIPTION OF THE PREFERRED EMBODIMENT

Figure 1:
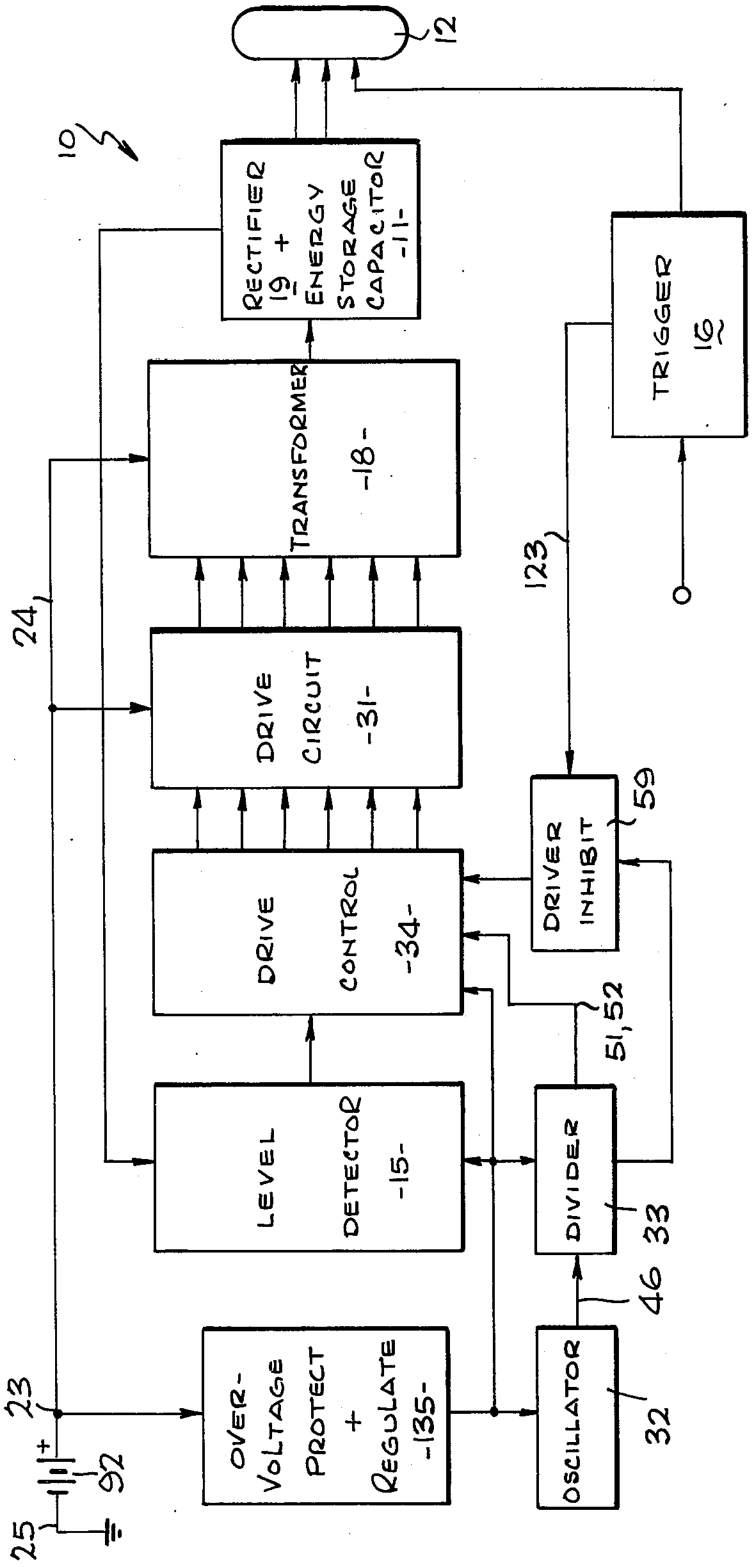
FIG. 1 is an electrical block diagram of a system for charging an energy storage capacitor in accordance with the present invention.
Figure 2:
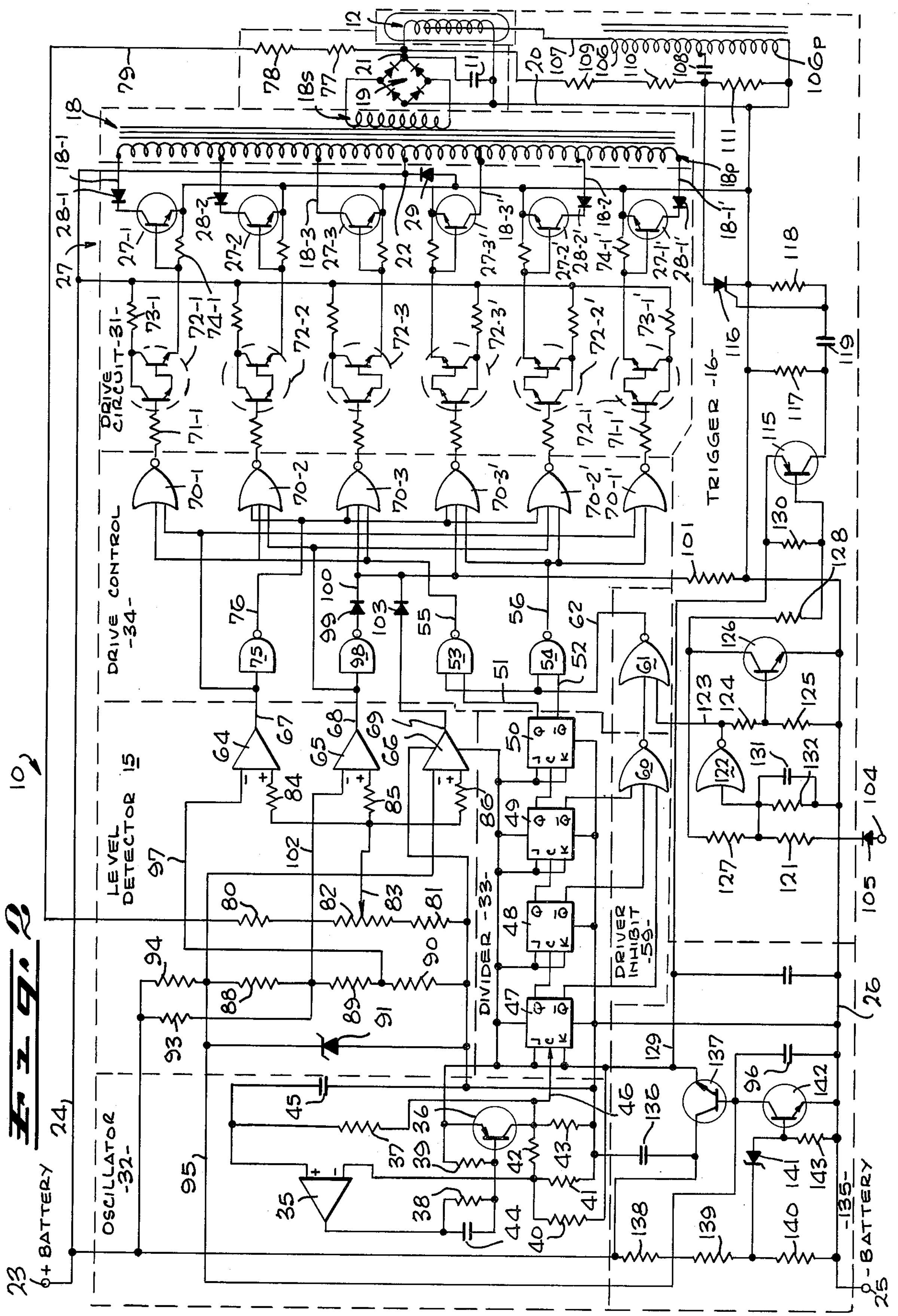
FIG. 2 is an electrical schematic diagram of the system of FIG. 1.

The following detailed description is of the best presently contemplated mode of carrying out the invention. This description is not to be taken in a limiting sense, but is made merely for the purpose of illustrating the general principles of the invention since the scope of the invention best is defined by the appended claims. Referring now to FIGS. 1 and 2, the inventive system 10 is used to charge an energy storage capacitor 11 to a voltage level sufficient to flash a strobe lamp 12 such as a General Electric type FT220. Optimum charging efficiency is achieved by charging the capacitor 11 in stepwise fashion to sequentially higher voltages until the desired charge level is obtained. In this manner, the charging follows a linear approximation (indicated by the broken line 13 in FIG. 3) of the exponential charging curve 14 of the capacitor 11.

To this end, the system 10 employs an inverter-type power supply that provides a charging voltage to the capacitor 11 which increases stepwise in voltage as specific charge voltage levels are reached by the capacitor 11. For example, initially a voltage $V_1$ (FIG. 3) is applied to the previously discharged capacitor 11. A relatively high current results as the capacitor 11 rapidly charges from 0 volts up to $V_1$ volts along the linear charging segment 13*a* of the curve 13 of FIG. 3.

Figure 3:
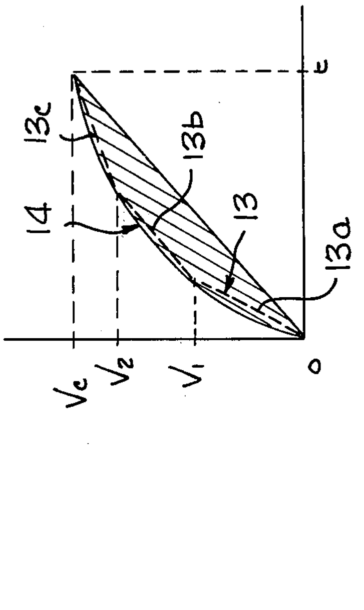
FIG. 3 is a graph of capacitor charging voltage as a function of time, illustrating the stepped sequence of charging rates employed in the system of FIGS. 1 and 2 to provide a linear approximation to the exponential charging curve of the energy storage capacitor.

When the capacitor 11 has reached the voltage level $V_1$, a level detector 15 causes a higher voltage $V_2$ (FIG. 3) to be applied. The capacitor 11 now charges up to that voltage level at a slightly lower rate indicated by the line segment 13*b*. When this level $V_2$ has been reached, the level detector 15 causes a still higher voltage $V_c$ to be applied. The capacitor 11 charges up to this $V_c$ voltage along the charging curve segment 13*c* (FIG. 3). The voltage $V_c$ is selected to be sufficient to flash the lamp 12, however flashing does not occur until an appropriate trigger signal is supplied from a circuit 16 described below. When the capacitor 11 has been charged to the level $V_c$, the level detector 15 terminates the charging cycle. If some charge should leak off of the capacitor 11 before the lamp 12 is flashed, this drop in voltage will be sensed by detector 15, which again will turn on the charging voltage at the $V_c$ level so as to bring the capacitor 11 charge back up to the desired level. In this way, the system 10 will maintain the capacitor 11 at the desired lamp charging voltage $V_c$ even during long periods between successive flashes.

To provide the sequentially increasing charge voltages, the system 10 employs a transformer 18 having a secondary winding 18*s* that is connected to a bridge rectifier 19. The output of the rectifier 19 is connected directly across the capacitor 11 via lines 20 and 21. The primary winding 18*p* of the transformer 18 has a center tap 22 that is connected directly to the positive (+) battery terminal 23 via a line 24. During the initial portion 13*a* of the charging cycle, the negative (−) battery terminal 25 is connected via a line 26, a pair of transistors 27-1, 27-1' and a pair of diodes 28-1, 28-1' to the terminals 18-1, 18-1' at the respective ends of the transformer primary 18*p*. As described below, the transistors 27-1 and 27-1' are turned on alternately, so that current flows alternately (*a*) in the half of the transformer primary 18*p* between the center tap 22 and the terminal 18-1, and then (*b*) in the half between the center tap 22 and the terminal 18-1'. This produces the voltage level $V_1$ across the capacitor 11.

Once the capacitor 11 charge level has reached $V_1$, the transistors 27-1 and 27-1' are disabled and the negative battery voltage is supplied alternately to the transformer primary 18*p* taps 18-2 and 18-2' via a pair of diodes 28-2, 28-2' and a pair of transistors 27-2, 27-2' that are turned on alternately. Since the effective turns ratio of the transformer 18 now is greater than before, the higher charge voltage $V_2$ appears across the rectifier 19 output . This facilitates charging of the capacitor 11 to a higher voltage level, but with less current and hence a slower charging rate as indicated by the lesser slope of the curve segment 13*b* in FIG. 3.

After the voltage level $V_2$ has been reached, the transistors 27-2 and 27-2' also are inhibited. Negative battery voltage then is applied alternately to the transformer taps 18-3 and 18-3' via a pair of transistors 27-3 and 27-3'. The effective turns ratio of the transformer 18 is now greatest, so that the voltage $V_c$ appears across the rectifier 19 output. The capacitor 11 then is charged to this level $V_c$ but with a slower charging rate indicated by the lesser slope of the curve segment 13*c* (FIG. 3). Reverse current flow through the transformer primary 18*p* is prevented by a diode 29.

The alternation rate of the various transistors 27 in the transformer drive circuit 31 is controlled by an oscillator 32 and a divider 33 in conjunction with a drive control circuit 34. The oscillator 32 employs an operational amplifier 35, a transistor 36, a set of resistors 37–43, and a pair of capacitors 44, 45. These are connected in conventional fashion to provide an oscillator output pulse train on a line 46 from the collector of the transistor 36.

The pulses on the line 46 are divided by sixteen in the divider 33. This circuit consists of four flip-flops 47-50 connected in conventional divider fashion. The flip-flop 50 provides alternate Q and $\overline{Q}$ outputs on the respective lines 51 and 52. When fed through the respective NAND-gates 53, 54, these outputs provide signals on the lines 55 and 56 that alternately turn on the pairs of drive transistors 27. Typical transistors take longer to turn off than to turn on. Therefore, to insure that each drive transistor 27 (e.g., transistor 27-1) is turned off before the other (e.g., transistor 27-1') is turned on, a driver inhibit circuit 59 is employed. The $\overline{Q}$ outputs of the flip-flops 47–49 are connected to a NOR-gate 60, the output of which is supplied via another NOR-gate 61 and a line 62 to the NAND-gates 53 and 54. With this arrangement, each time the flip-flop 50 changes state, a low signal occurs on the line 62 for a duration equal to one clock pulse time of the oscillator 32. This causes both control signals on the lines 55 and 56 to be high, which in turn forces all of the transistors 27 to the off or non-conducting state. In turn, this insures that each such transistor 27 will be turned off completely before its cognate transistor is turned on.

At the start of the charging cycle, when the voltage across the energy storage capacitor 11 is zero, the three operational amplifiers 64, 65, 66 each will provide a low output on its respective output line 67, 68, 69. This will cause the drive transistor pair 27-1 and 27-1' to be operative. Specifically, the low signal on the line 67 will cause a NOR-gate 70-1 to provide a high output signal via a resistor 71-1 to turn on a Darlington circuit 72-1 each time the alternation signal on the line 55 is low. Similarly, the low signal on the line 67 also will cause a NOR-gate 70-1' to provide a signal via a resistor 71-1' to turn on a Darlington circuit 72-1′ each time the alternation signal on the line 56 is low. When the Darlington circuit 72-1 is on, current flows via a pair of resistors 73-1 and 74-1 so as to bias on the transistor 27-1. Alternately, when the Darlington 72-1′ is on, current flows through a pair of resistors 73-1′ and 74-1′ so as to bias on the transistor 27-1′. In this manner, current is switched to alternate halves of the transformer primary 18*p*, and the voltage $V_1$ is supplied to the capacitor 11 as described above. Since the line 67 is low, a NAND-gate 75 provides a high output on a line 76 that causes the outputs of a set of NOR-gates 70-2, 70-2′, 70-3 and 70-3′ all to be low. As a result, all of the other transistors 27 are inhibited.

The voltage to which the capacitor 11 has been charged is supplied as a feedback signal to the level detector 15 via a pair of resistors 77, 78 and a line 79. This feedback voltage is supplied across a voltage divider consisting of two fixed resistors 80, 81 and a potentiometer 82. The voltage from the tap 83 of the potentiometer 82 is supplied via respective resistors 84, 85, 86 to the non-inverting (+) inputs of the respective operational amplifiers 64, 65 and 66. At these amplifiers, the feedback voltage is compared with three reference voltage levels obtained from a divider network including the resistors 88, 89 and 90. The voltage across this divider is held constant by a Zener diode 91. Feedback compensation for changes in voltage of the supply battery 92 is provided by a resistor 93 connected between the battery terminal 23 and the junction of the resistors 88 and 89. Voltage to the divider network 88–90 is supplied via a resistor 94, a line 95 and a filter capacitor 96, A relatively low reference voltage is supplied to the inverting (−) input of the operational amplifier 64 via a line 97 from the junction of the resistors 89 and 90. The value of this reference signal establishes the first charging voltage level $V_1$. In other words, when the charging voltage feedback signal supplied via the line 79 causes the voltage supplied via the resistor 84 to rise above the level of the reference signal on the line 67, the operational amplifier 64 provides a high output on the line 67. This causes the transistor driver pair 27-1 and 27-1′ to be inhibited, and enables the drive transistors 27-2 and 27-2′.

To this end, the high signal on the line 67 causes the NOR-gates 70-1 and 70-1′ to provide low outputs, thereby turning off the Darlingtons 72-1 and 72-1′ to inhibit the transistors 27-1 and 27-1′. The high signal on the line 67 causes the NAND-gate 75 to produce a low signal on the line 76. The output of the operational amplifier 65 remains low (since the charging level $V_2$ has not yet been reached), so that the low signal on the line 68 is supplied to the NOR-gates 70-2 and 70-2′ which also receive the low signal on the line 76. As a result, these NOR-gates 70-2 and 70-2′ alternately provide high outputs as the respective alternation signals on the lines 55 and 56 go low. These high outputs alternately turn on the Darlington circuit 72-2 and 72-2′ which in turn alternately turn on the transistors 27-2 and 27-2′. As described above, this supplies the battery voltage alternately to the transformer 18 taps 18-2 and 18-2′ so as to provide the voltage $V_2$ from the rectifier bridge 19. Since the signal on the line 68 is low, a NAND-gate 98 provides a high signal via a diode 99, a line 100 and a resistor 101 that forces the outputs of the NOR-gates 70-3 and 70-3′ to be low. This keeps off the Darlingtons 72-3 and 72-3′, and hence inhibits the drive transistors 27-3 and 27-3′.

When the voltage across the capacitor 11 reaches the level $V_2$, the voltage supplied to the positive input of the operational amplfier 65 via the resistor 85 will exceed the level of the reference voltage supplied to the negative (−) terminal via a line 102 from the junction of the resistors 88 and 89. As a result, the amplifier output on the line 68 will go high. The output from the operational amplifier 64 on the line 67 will remain high, since of course the lowest reference voltage on the line 97 still has been exceeded by the feedback signal. As a result of the high signal on the line 68, the NOR-gate 70-2 and 70-2′ both will produce low outputs, thereby turning off the Darlington 72-2 and 72-2′, and inhibiting the drive transistors 27-2 and 27-2′. The output of the NAND-gate 98 will provide a low signal on the line 100, which in conjunction with the low signal on the line 76 will enable the NOR-gates 70-3 and 70-3′ alternately as the respective alternation signals on the lines 55 and 56 go low. In turn, this will alternately turn on the Darlingtons 72-3 and 72-3′, and alternately turn on the corresponding drive transistors 27-3 and 27-3′. As described above, this will cause output of the high charging voltage $V_c$ from the rectifier 19.

When the capacitor 11 charges up to this desired value $V_c$, the feedback signal supplied to the operational amplifier 66 via the resistor 86 will exceed the relatively high reference voltage supplied via the line 95 to the negative (−) input of that amplifier. As a result, the output on the line 69 will go high. This high signal, supplied via a diode 103 to the line 100 will cause the NOR-gates 70-3 and 70-3′ to provide low outputs, which turn off the Darlington 72-3 and 72-3′ and inhibit the drive transistors 27-3 and 27-3′. The high signal on the line 67 causes the transistor pair 27-1 and 27-1′ to remain inhibited as described above, and the high signal on the line 68 causes the transistor pair 27-2 and 27-2′ to remain inhibited. As a result, no voltage is applied to the transformer 18 primary, and no additional voltage is supplied to the capacitor 11 which of course is now fully charged to the level $V_c$. If some charge should leak off of that capacitor 11 so that the voltage drops below $V_c$, the feedback signal at the resistor 86 will drop below the reference level supplied on the line 95, and the output of the operational amplifier 66 again will go low. As described above, the transistor pair 27-3 and 27-3′ again will be switched on, providing an appropriate charging voltage to the capacitor 11 to bring the charge back up to the $V_c$.

To flash the lamp 12, a low trigger input is supplied to the trigger circuit 16 via a terminal 104 and a diode 105. This causes a high ionization voltage to be supplied from a transformer 106 via a line 107 to the lamp 12. As a result, gas in the lamp 12 is ionized, and the capacitor 11 is discharged through the lamp 12 to produce a very intense burst of light. Thereafter, since the capacitor 11 is discharged and the feedback voltage on the line 79 is zero, a new charging cycle is initiated so as to recharge the capacitor 11 in the manner described above.

During the capacitor 11 charging cycle, the voltage from the rectifier bridge 19 also is used to charge a trigger capacitor 108. To this end, the terminal 21 is connected to the capacitor 108 via a set of resistors 109, 110 and 111. When the low trigger pulse occurs at the terminal 104, a transistor 115 is turned on. This in turn triggers on a silicon controlled rectifier (SCR) 116 via a network consisting of a pair of resistors 117, 118 and a capacitor 119. Turn on the SCR 116 discharges the capacitor 108 across the primary 106_p_ of the transistor 106, thereby producing the high ionization pulse on the line 107.

It is possible that the lamp 12 will be triggered when the voltage on the capacitor 11 is below $V_c$, and hence while voltage is being supplied to the capacitor 11 via the transformer 18. Under this condition, the ionized lamp 12 would provide essentially a short circuit across the transformer 18 output. To prevent damaging the charging circuit 10 during this condition, the trigger circuit 16 is interconnected to the driver inhibit circuit 59 so as to turn off all of the drive transistors 27 when the lamp 12 is triggered. To this end, the trigger signal from the diode 105 is supplied via a resistor 121 to a NOR-gate 122 the output of which is connected via a line 123 to the NOR-gate 61 in the driver inhibit circuit 59.

Normally the input at the trigger terminal 104 is high, so that the output of the NOR-gate 122 is low. Thus when a low trigger pulse is applied, the potential at the terminal 104 drops toward ground (i.e., toward the negative potential present on the line 26), and the output of the NOR-gate 122 goes high. This causes the NOR-gate 61 to produce a low signal on the line 62 which forces all of the drive transistors 27 to the off condition, as described above. Input to the transformer 18 thus is turned off when the lamp 12 is triggered.

Before occurrence of the triggered pulse, the low output of the NOR-gate 122 is communicated via a pair of resistors 124, 125 to the base of a transistor 126. This holds the transistor 126 off, and allows the high signal present at the trigger terminal 104 to be communicated via the diode 105, the resistor 121 and a pair of resistors 127, 128 to the base of the transistor 115. This base also is connected to a regulated positive voltage line 129 via a resistor 130. With this arrangement, the transistor 115 normally is cut off, and no trigger signal is supplied to the SCR 116. The normally high input of the terminal 104 also charges a capacitor 131 via a divider including the resistor 121 and another resistor 132.

Occurrence of the low trigger signal at the terminal 104 does not immediately turn on the transistor 115. Rather, the charge on the capacitor 131 holds the input to the NOR-gate 122 high, and hence keeps the transistor 126 turned off for a brief period of time until the capacitor 131 discharges. Only thereafter does the output of the NOR-gate 122 go high, so as to turn on the transistor 126 which in turn clamps the junction of the resistors 127 and 128 to the negative line 126, and hence turns on the transistor 115 and triggers on the SCR 116. In other words, the trigger circuit 16 is responsive only to input pulses of a certain minimum length established by the discharge time of the capacitor 131.

Over-voltage protection and regulation of the voltage used to power various circuits of the system 10 are provided by a circuit 135 (FIGS. 1 and 2).

The battery voltage is filtered by a capacitor 136 and supplied via a series regulation transistor 137 to the line 129. A reference voltage is obtained from a voltage divider consisting of the resistors 138–140 connected across the battery terminals 23 and 25. A Zener diode 141 connected to the junction of the resistors 139 and 140 provides a reference bias signal to the base of a transistor 142 across a resistor 143. The collector of the transistor 142 is connected to the base of the transistor 137 to facilitate series regulation. Should the battery 92 voltage become excessive, the transistor 142 will turn fully on, thereby clamping off the transistor 137 and removing the regulated positive voltage from the line 129. Intending to claim all novel, useful and unobvious features shown or described, the inventor makes the following:

I claim:

1. A system for charging an energy storage capacitor to a selected voltage level, comprising:

a transformer having a tapped primary winding and a secondary winding;

a rectifier connected to said secondary winding to rectify the output of said transformer, said rectified output being supplied to said energy storage capacitor;

at least two pairs of drivers connected to different taps of said primary winding, each pair of drivers being alternately switched on and off to provide an alternating input to said transformer;

level detector means, responsive to the voltage across said energy storage capacitor, for sequentially enabling different pairs of said drivers as the voltage across said energy storage capacitor reaches progressively higher preselected values, said enabled pairs of drivers providing an input to progressively decreasing portions of said transformer primary winding so that a corresponding larger voltage output, at lower current, is supplied via said secondary winding and rectifier to said energy storage capacitor;

said transformer primary winding is center-tapped, one polarity terminal of a voltage source being connected to said center tap, each pair of drivers comprising first and second drive transistors respectively connected to apply voltage from the other polarity terminal of said source to a respective primary winding tap on opposite sides of said center-tap, said system further comprising;

alternation means for periodically, alternately turning on one drive transistor and turning off the other drive transistor in an enabled pair of drivers;

said alternation means comprises:

an oscillator;

a counter, said counter having alternating output signals, and circuit means connecting said alternating output signals to said drivers alternately to enable the drive transistors in each pair.

2. A capacitor charging system according to claim 1 wherein said counter comprises a chain of flip-flops, said alternating outputs being obtained from the last flip-flop in said chain, and further comprising;

driver inhibit means, responsive to the states of said counter flip-flops, for inhibiting both of said alternating output signals for a short portion of the alternation cycle each time said last flip-flop changes state, so that both drive transistors in said enabled pair are turned off for said short portion of the cycle, thereby insuring that each transistor in said enabled pair will be fully off before the other is turned on.

3. A system for charging an energy storage capacitor to a selected voltage level, comprising:

a transformer having a tapped primary winding and a secondary winding;

a rectifier connected to said secondary winding to rectify the output of said transformer, said rectified output being supplied to said energy storage capacitor;

at least two pairs of drivers connected to different taps of said primary winding, each pair of drivers being alternately switched on and off to provide an alternating input to said transformer;

level detector means, responsive to the voltage across said energy storage capacitor, for sequentially enabling different pairs of said drivers as the voltage across said energy storage capacitor reaches progressively higher preselected values, said enabled pairs of drivers providing an input to progressively decreasing portions of said transformer primary winding so that a corresponding larger voltage output, at lower current, is supplied via said secndary winding and rectifier to said energy storage capacitor;

said level detector means comprises:

means for providing respective enable signals to successive pairs of drivers as the voltage across aid energy storage capacitor reaches respectively increasing preselected values, said enable signals sequentially enabling pairs of drivers connected to progressively smaller portions of said transformer primary winding;

said means for providing comprises:

a set of operational amplifiers respectively supplied with fixed reference voltages of respectively larger value, said feedback voltage being provided to all of said operational amplifiers for comparison therein with the reference voltage provided thereto; and driver control logic, responsive to the outputs of said operational amplifiers, for providing said enable signals.

* * * * *